J. O. CARLSON.
THRESHING MACHINE.
APPLICATION FILED JULY 9, 1907.
903,054.
Patented Nov. 3, 1908.
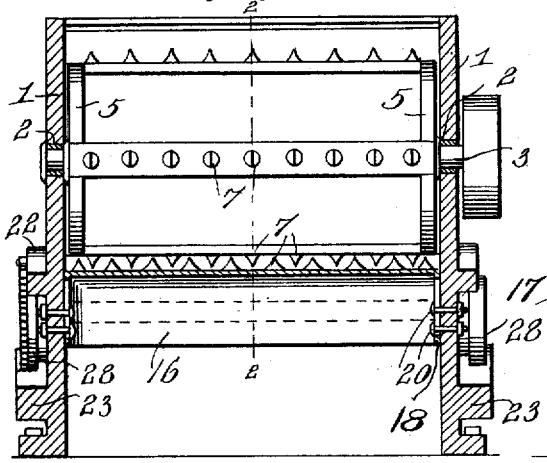
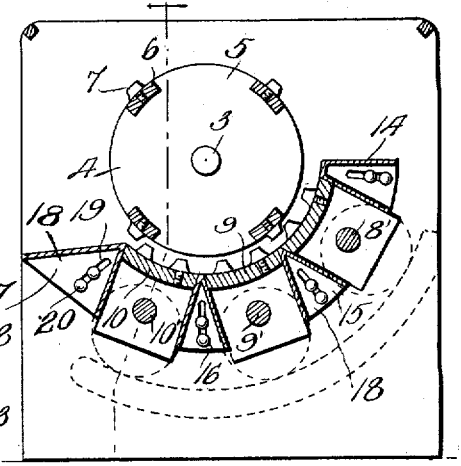
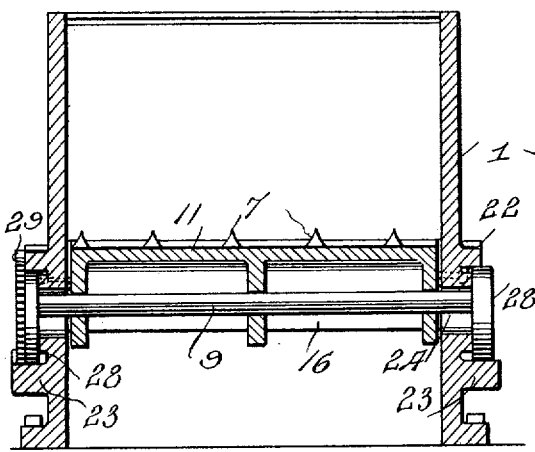
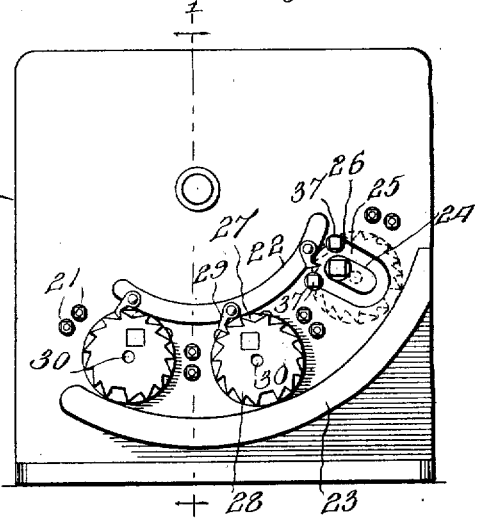
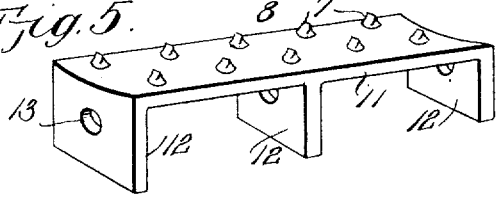
Witnesses
Frank Hough
C. C. Hines
Inventor
John O. Carlson,
By Victor J. Evans
Attorney

UNITED STATES PATENT OFFICE.

JOHN O. CARLSON, OF FUNK, NEBRASKA.

THRESHING-MACHINE.

No. 903,054.  Specification of Letters Patent.  Patented Nov. 3, 1908.

Application filed July 9, 1907. Serial No. 382,895.

*To all whom it may concern:*

Be it known that I, JOHN O. CARLSON, a citizen of the United States, residing at Funk, in the county of Phelps and State of Nebraska, have invented new and useful Improvements in Threshing-Machines, of which the following is a specification.

This invention relates to improvements in threshing machines, and particularly to concaves therefor, the object of the invention being to provide a sectional concave and means for individually adjusting the sections thereof and their supports, whereby the sections may be readily and conveniently thrown into and out of operative position at will, and arranged with relation to the cylinder to suit different conditions of service, without the necessity of stopping the operation of the machine.

The present invention embodies an improvement upon the construction disclosed in my prior application filed March 22, 1907, Serial No. 363,904.

With the above and other objects in view, the invention consists of the features of construction, combination and arrangement of parts hereinafter fully described and claimed, reference being had to the accompanying drawing in which:—

Figure 1 is a vertical transverse section on line 1—1 of Fig. 4 through the frame of the machine and the concave. Fig. 2 is a vertical longitudinal section on line 2—2 of Fig. 1. Fig. 3 is a vertical transverse section on the irregular line 3—3 of Fig. 2. Fig. 4 is a side elevation, showing the adjusting and locking means for the concave sections on one side of the machine, one of the ratchet wheels being omitted and indicated in dotted lines to better show the frame construction. Fig. 5 is a perspective view of one of the concave sections. Fig. 6 is a similar view of the wrench or tool for adjusting the concave sections.

Referring to the drawing, the numeral 1 represents the sides of the machine frame, provided with bearings 2 for a shaft 3, on which is mounted the cylinder 4, which, in the form shown, comprises a pair of end disks or heads 5 connected by bars 6 carrying threshing teeth 7.

The concave comprises a series of sections 8, 9 and 10, which are similar in form, each consisting of a body portion 11 formed or provided with depending supporting arms or flanges 12 having alined openings 13, said concave sections being respectively mounted upon transverse shafts or axles 8', 9' and 10' extending through the openings 13 in their respective arms, the openings being of sufficient size to loosely mount the concave sections upon the shafts so that said sections will not turn or rotate with the shaft.

The several concave sections are arranged to slide in guide ways toward and from the cylinder, the said guide-ways being formed by transverse frame pieces or partitions 14, 15, 16 and 17, constructed of sheet-metal or other suitable material, each frame piece or partition being substantially of inverted V-form or triangular form in cross-section, varying to a greater or less extent therefrom according to the requirements resulting from their relative positions to produce a supporting means extending on an arc concentric with the axis of the cylinder. Each end frame or partition is provided with end walls 18 formed with longitudinal slots 19 for the passage of securing bolts 20 which extend exteriorly through the sides 1 of the frame and are provided at their outer ends with nuts 21, by which the parts of the frame of the concave may be independently and individually adjusted toward and from the cylinder.

Arranged on the exterior of each side 1 of the main frame are upper and lower guide ribs or rails 22 and 23, between which said sides are provided with slots 24 equal in number to and corresponding in arrangement with the respective concave sections and through which pass the ends of the shafts 8', 9' and 10', each opening being externally surrounded by a rib or raised portion 25 cut away at points to provide partially circular recesses 26.

The projecting ends of the shafts 8', 9' and 10' are angular in form to fit correspondingly shaped openings in circular eccentric heads or disks 27 fitted thereon, which disks on the several shafts are arranged in the spaces between the oppositely sets of rails 22 and 23 and bear thereon so as to be held from movement longitudinally of the guide slots 24, in which the shafts are free to slide as the disks are turned to effect the adjustment of the concave sections toward and from the cylinder. The eccentric heads or disks at one side of the frame are provided with ratchet teeth 28 adapted to be engaged by locking dogs or pawls 29 pivotally mounted upon the rails 2 whereby the disks may be secured from movement to hold the shafts and concave sections in adjusted position. Each ratchet eccentric is also formed with a central recess or opening 30, for a purpose hereinafter described.

It will be apparent from the foregoing description that by turning the ratchet eccentrics in one direction or the other the shaft may be adjusted longitudinally in the slots 24 to move the concave section toward and from the cylinder, thereby enabling said sections to be conveniently thrown into or out of action at will or adjusted with relation to the cylinder to suit different contingencies of service; and that by adjusting the guide frame pieces the range of adjustment of the concave sections may be correspondingly varied. This operation will, as will be further apparent, adapt the cylinder and concave to have a variable threshing action, and may be performed during the threshing action without stopping the operation of the machine.

A wrench or turning tool is provided to enable the ratchet eccentrics to be conveniently adjusted, and, as shown in Fig. 6, such tool comprises a bar or shank 31 having an operating handle 32. At the center of the bar or shank is a pivot pin or stud 33 adapted to be fitted in the opening 30 of either ratchet eccentric, and at the opposite ends of the shank are coöperating gripping teeth or dogs 34 and 35. The dog 34 is rigid with the shank, while the dog 35 is movable in a slot in the shank, in which slot is arranged a spring 36 tending to normally move the dog 35 toward the dog 34. In applying the wrench for turning either ratchet eccentric, the stud 33 is fitted in the opening 30, the tooth 34 engaged with a ratchet tooth at one side of the disk and the teeth 35 adjusted into engagement with a ratchet tooth at the opposite side of the disk, thus locking the wrench to the disk, after which, upon release of the pawl 29, the ratchet disk may be turned by the wrench to adjust its concave section in an obvious manner. To release the wrench it is simply necessary to retract the tooth 35, whereupon the wrench may be readily detached.

In order to hold each concave section against tilting on its shaft, a pair of set screws 37 is provided, said screws passing through openings in the sides 1 of the main frame and having their inner ends arranged to engage the end arms of the concave section on opposite sides of the pivot openings 13, whereby said concave section may, after adjustment, be held rigidly against rocking movement. The heads of these screws lie in the recesses 26 flush with the outer face of the rib 25, so that they will not interfere with the movements of ratchet disks.

From the foregoing description, taken in connection with the accompanying drawing, the construction and mode of operation of the invention will be readily understood, and it will be seen that it provides a concave having a maximum range of adjustment and in which the adjustments of the sections thereof may be effected without stopping the threshing machine.

Having thus described the invention, what I claim as new and desire to secure by Letters Patent is:—

In a threshing machine, the combination of a frame having slotted side walls, a cylinder, shafts arranged within the frame and extending at their ends through the slots in said side walls, guides upon the outer faces of said walls above and below the slots, eccentrics fixed to the ends of the shafts and located between said guides, a concave formed of sections independently mounted upon the respective shafts and adapted to be moved by the rotation thereof toward and from the cylinder, guides for the concave sections adjustably secured to the side walls and arranged between said concave sections, and locking means for securing each eccentric in its adjusted positions.

In testimony whereof, I affix my signature in presence of two witnesses.

JOHN O. CARLSON.

Witnesses:
A. Franzen,
B. E. Morrow.